US011190572B1

(12) United States Patent
Meyer et al.

(10) Patent No.: US 11,190,572 B1
(45) Date of Patent: Nov. 30, 2021

(54) METHOD AND APPARATUS FOR ACCESSING DATA FOR LARGE EVENTS WITH A SMART MOBILE APPLICATION

(71) Applicant: UIPCO, LLC, San Antonio, TX (US)

(72) Inventors: Gregory Brian Meyer, San Antonio, TX (US); Mark Anthony Lopez, Helotes, TX (US); Ravi Durairaj, San Antonio, TX (US); Nolan Serrao, Plano, TX (US); Victor Kwak, Frisco, TX (US); Ryan Thomas Russell, The Colony, TX (US); Christopher Russell, The Colony, TX (US); Ruthie D. Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/942,863

(22) Filed: Jul. 30, 2020

Related U.S. Application Data (60) Provisional application No. 62/880,731, filed on Jul. 31, 2019.

(51) Int. Cl.
*H04L 29/08* (2006.01)
(52) U.S. Cl.
CPC .............. *H04L 67/02* (2013.01); *H04L 67/18* (2013.01); *H04L 67/2814* (2013.01); *H04L 67/2842* (2013.01); *H04L 69/329* (2013.01)
(58) Field of Classification Search
CPC ..... G06F 16/9574; H04L 67/02; H04L 67/18; H04L 67/2814; H04L 67/2842; H04L 69/329; H04L 67/14; H04L 67/22; H04L 67/303; H04L 63/1408; G06Q 30/0613; G06Q 50/01
See application file for complete search history.

(56) References Cited

U.S. PATENT DOCUMENTS

| | | | | |
|---|---|---|---|---|
| 8,725,849 B1 * | 5/2014 | Lloyd | ................. | G06F 16/9574 709/220 |
| 2011/0270691 A1 * | 11/2011 | Park | ................... | G06Q 30/0277 705/14.73 |

(Continued)

FOREIGN PATENT DOCUMENTS

WO  WO 2017100640  *  6/2017  ............. H04L 29/08

*Primary Examiner* — Tonia L Dollinger
*Assistant Examiner* — Linh T. Nguyen
(74) *Attorney, Agent, or Firm* — Plumsea Law Group, LLC (57) ABSTRACT

A system and method for determining and storing website data from high traffic websites in memory during a large event at an event location for access by mobile computing devices through an event application is disclosed. The method may include determining, by a local server system at the event location, high traffic websites from the detected plurality of websites accessed by the users through the mobile computing devices at the event location. The method may also include allowing a user to select a website and retrieve website data for the selected website from the memory of the local server system when the selected website is a high traffic website by converting a uniform resource locator of the website managed by a service provider to a local uniform resource locator pointing to a storage location of website data stored in the local server system.

18 Claims, 8 Drawing Sheets

(56) References Cited

U.S. PATENT DOCUMENTS

| | | | |
|---|---|---|---|
| 2013/0066936 A1* | 3/2013 | Krishnan | H04L 67/289 709/201 |
| 2013/0308470 A1* | 11/2013 | Bevan | H04W 36/32 370/252 |
| 2015/0189542 A1* | 7/2015 | Cazanas | H04L 12/189 370/312 |
| 2016/0182929 A1* | 6/2016 | Ortiz | H04N 21/4331 725/25 |
| 2016/0226995 A1* | 8/2016 | Senarath | H04L 49/08 |
| 2017/0064037 A1* | 3/2017 | Das | H04W 4/18 |
| 2019/0287391 A1* | 9/2019 | Ozawa | G08G 1/0112 |
| 2021/0168415 A1* | 6/2021 | Zhu | H04L 67/2842 |

* cited by examiner

METHOD AND APPARATUS FOR ACCESSING DATA FOR LARGE EVENTS WITH A SMART MOBILE APPLICATION

CROSS-REFERENCE TO RELATED APPLICATIONS

This application claims the benefit of Provisional Patent Application No. 62/880,731 filed Jul. 31, 2019, and titled "Method and Apparatus for Accessing Data for Large Events with a Smart Mobile Application," which is incorporated by reference herein in its entirety.

TECHNICAL FIELD

The present disclosure generally relates to mobile devices, and in particular to methods and systems that permit mobile computing devices to select an efficient resource for content delivery.

BACKGROUND

Events frequently attract large numbers of individuals (users) who use mobile computing devices to access websites through the Internet during an event. An example of an event is a sporting event and a sporting event is typically hosted at an event location such as a stadium, which may be outdoors or indoors. Before, during, and after a sporting event at a stadium, users may wish to access websites. For example, if the sporting event is a football game, then users may wish to access a local broadcast such as local station with local sports analysts or a national broadcast from a national broadcaster such as ESPN who have national sports analysts. Users may also browse websites that provide updated scores and news for other sporting events occurring at the same time. However, if users attempt to access high traffic websites at an event location, users may have difficulty accessing these high traffic websites due to congestion caused by a large number of users at the event attempting to access the same high traffic websites.

There is a need in the art for a system and method that addresses the shortcomings discussed above.

SUMMARY

In one aspect, a method for determining and storing website data from high traffic websites in memory of a local server system during a large event at an event location for access by mobile computing devices, includes detecting, by the local server system, high traffic websites from a plurality of websites accessed by the users through the mobile computing devices at the event location, and storing website data from the detected high traffic websites in the memory of the local server system; activating, on a first mobile computing device of the mobile computing devices at the event location, an event application, which transmits a request from the first mobile computing device for communication with the local server system; granting, by the local server system, the request for communication from the first mobile computing device, and transmitting, from the local server system, to the first mobile computing device a high traffic website list corresponding to website data stored in the local server system, wherein the high traffic website list includes local uniform resource locators corresponding to uniform resource locators of service providers and the uniform resource locators of the service providers; receiving a selection of a website by the user through the first mobile computing device; determining whether the selected website is listed on the high traffic website list; retrieving the website data corresponding to the selected website by way of one of the uniform resource locators of one of the service providers when the selected website is not on the list of high traffic websites; retrieving website data corresponding to the selected website by way of one of the local uniform resource locators of the local server system storing website data when the selected website is on the list of high traffic websites; and outputting the retrieved website data on a mobile computing device.

In another aspect, a system for determining and storing website data from high traffic websites in memory during a large event at an event location for access by mobile computing devices, includes a local server system positioned at the event location, which is coupled to the mobile computing devices to detect a plurality of websites accessed by users of the mobile computing devices at the event location, which determines high traffic websites from the detected plurality of websites accessed by the users through the mobile computing devices at the event location, and which stores website data of high traffic websites in a memory of the local server system; and a first mobile computing device, from the mobile computing devices, which stores an event application and which is coupled to the local server through the event application, wherein the first mobile computing device employing the event application transmits a request from the first mobile computing device to a local server system for communication with the local server system receives, from the local server system, authorization to communicate with the local server, and a high traffic website list corresponding to website data stored in the local server system, wherein the high traffic website list includes local uniform resource locators corresponding to uniform resource locators of service providers and the uniform resource locators of the service providers; receive a selection of a website by the user; determines whether the selected website is listed on the high traffic website list; retrieves website data corresponding to the selected website by way of one of the uniform resource locators of one of the service providers when the selected website is not on the list of high traffic websites; retrieves website data corresponding to the selected website by way of one of the local uniform resource locators of the local server system storing website data when the selected website is on the list of high traffic websites; and outputs the retrieved website data on the first mobile computing device.

In another aspect, a non-transitory computer readable medium storing a software application on a mobile computing device including instructions, executable by one or more computing devices of the mobile computing device, which upon execution, cause the one or more computing devices to: activate, on the mobile computing device the software application, which transmits a request from the mobile computing device to a local server system for communication with the local server system; receive, from the local server system, authorization to communicate with the local server, and a high traffic website list corresponding to website data stored in the local server system, wherein the high traffic website list includes local uniform resource locators corresponding to uniform resource locators of service providers and the uniform resource locators of the service providers; receive a selection of a website by the user; determine whether the selected website is listed on the high traffic website list; retrieve website data corresponding to the selected website by way of one of the uniform resource locators of one of the service providers when the selected website is not on the list of high traffic websites; retrieve website data corresponding to the selected website by way of one of the local uniform resource locators of the local server system storing website data when the selected website is on the list of high traffic websites; and output the retrieved website data on the mobile computing device.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Embodiments provide systems, methods, and devices for determining and storing website data from high traffic websites in memory during a large event at an event location for access by mobile computing devices by way of an event application stored on mobile computing devices. Embodiments may reduce network congestion during an event such as a football game hosted at an event location such as a stadium by predicting and/or identifying (detecting or determining) high traffic websites and storing website data from these websites in a memory of a local server system through a local wireless network. An example of a memory is a cache. During an event, a user attending the event may initiate an event application on the mobile computing device of the user, which initiates communication with the local server system through the local wireless network. The mobile computing device may receive a list of high traffic websites stored in the local server system. When a user requests access to one of the high traffic websites, the mobile computing device may automatically convert the uniform resource locator (URL) of the high traffic website to a local URL so that the mobile computing device is directed to receive the high traffic website from the local server system instead of directly from a service provider hosting the high traffic website. By accessing one or more of these high traffic websites stored in the local server system, the mobile computing device receives the website data from the local server system instead of the Internet, so that the mobile computing device can provide an audio and/or visual output to the user without delay due to the traffic congestion, which may be caused by other users attempting to access website data directly from the service providers hosting high traffic websites.

Figure 1:
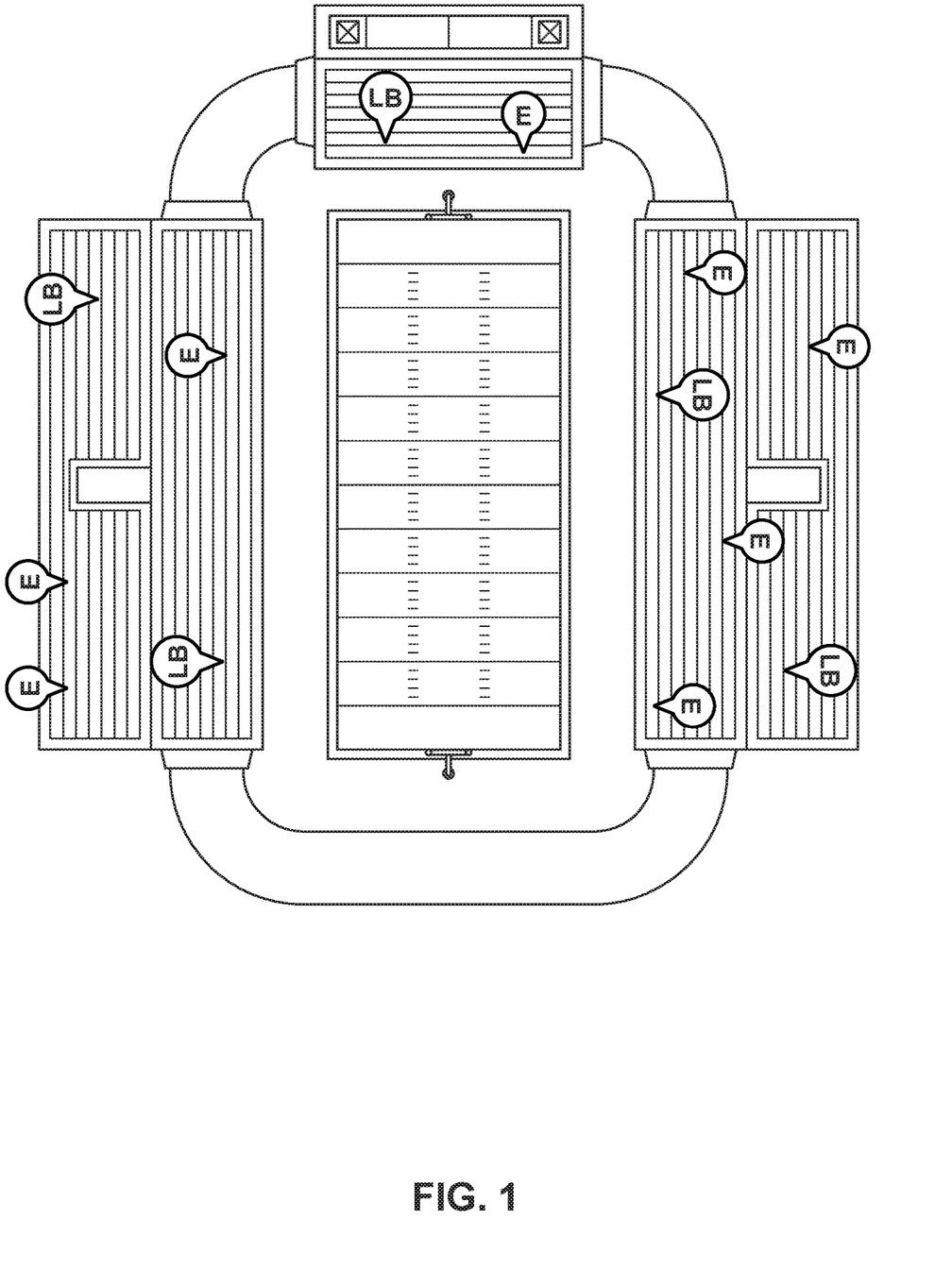
FIG. 1 is a schematic view of an event location depicting website traffic according to an embodiment.

FIG. 1 is a schematic view of an event location depicting website traffic. As indicated in the example shown in FIG. 1, users, through mobile computing devices may wish to access the Internet in order to access websites providing a local broadcast (LB) or national broadcast (E) of an event (e.g. football game) at the event location (stadium or arena). An example of a national broadcaster is ESPN®. However, because many users may be attempting to access a local broadcast website or a national broadcast website through the Internet by using a service provider hosting the website or providing access to the website, the mobile computing devices may experience delays in receiving audio/video coverage of the event due (e.g. live streaming) because the service provider may be unable to handle the demand due to congestion. Websites providing a local broadcast (LB) of an event and a national broadcast (E) of an event are frequently high traffic websites.

Figure 2:
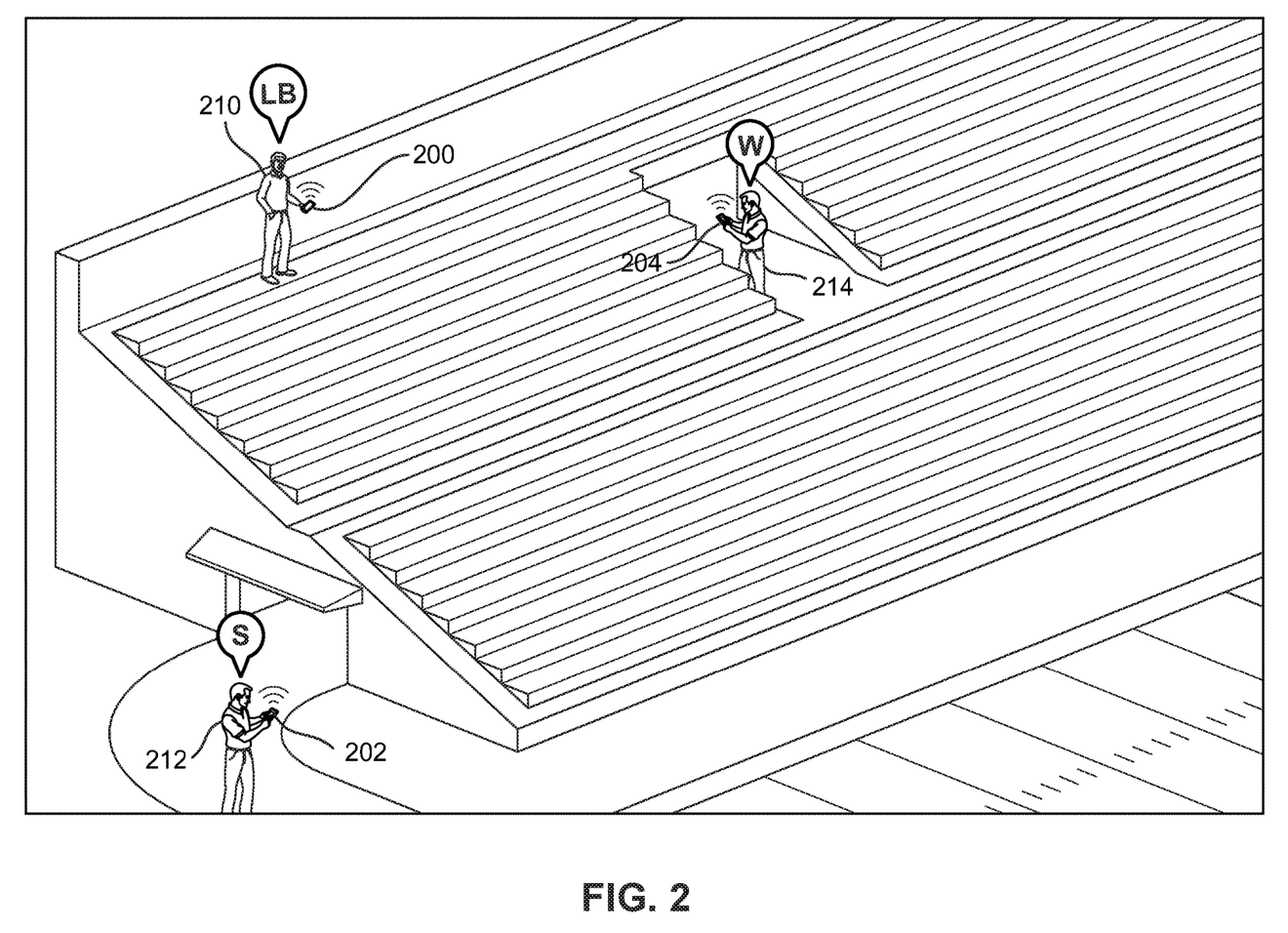
FIG. 2 is a schematic view of mobile computing devices accessed by users located at an event location according to an embodiment.

FIG. 2 is a schematic view of mobile computing devices 200, which are accessing websites, as instructed by users 210 located at an event location according to an embodiment. A first user 210 may wish to access a high traffic website such as a website providing a local broadcast (LB) on a first mobile computing device 200. However, a second user 212 may wish to access a low traffic website such as a financial website (S) for trading stocks on a second mobile computing device 202. The financial website may be a low traffic website since the stock market is probably closed during a football game. A third user 214 may wish to access a website which may be high traffic or low traffic such as a weather website (W) on a third mobile computing device 204. For example, if the weather is sunny with no clouds in the sky, the weather website (W) may experience low traffic. However, if the sky is overcast, the weather website (W) may become a high traffic website.

Figure 3:
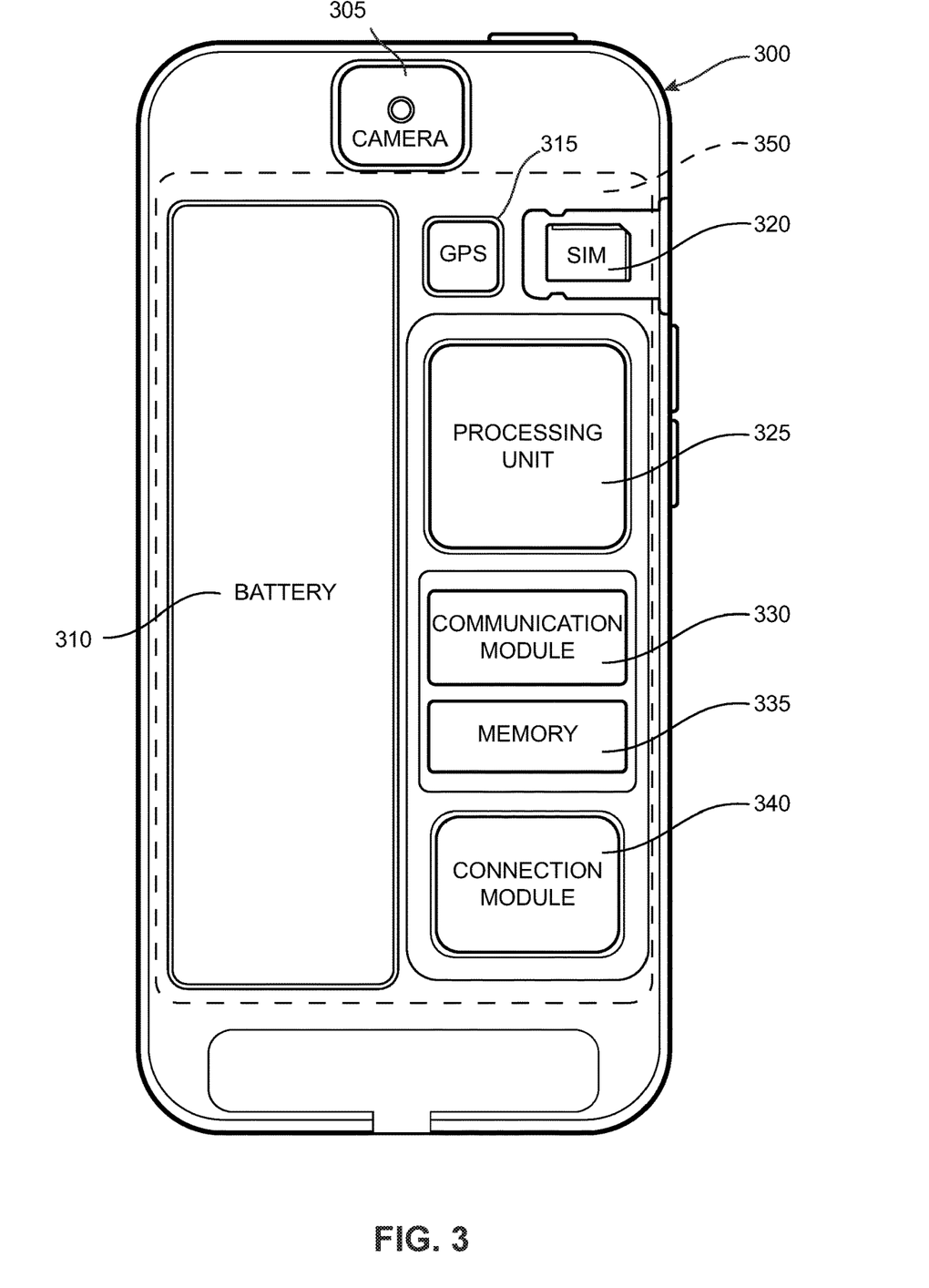
FIG. 3 is a schematic view of an embodiment of a mobile computing device.

FIG. 3 is a schematic view of an embodiment of a mobile computing device 300 which is an example of the mobile computing device 200 shown in FIG. 2. Although the mobile computing device 300 in FIG. 3 is shown as a smart phone, examples of mobile computing devices include a smartphone, a tablet, a smartwatch, a smart glass, a smart helmet, and a laptop. Although embodiments refer to the use of mobile computing devices, any computing device may run software applications in embodiments.

As shown in FIG. 3, a mobile computing device 300 may include a camera 305, a battery 310, a global positioning system 315, a subscriber identity module (SIM) 320, a processing unit 325, a communication module 330, a memory 335, and a connection module 340. A display 350 of the mobile computing device 300 is shown by a dotted line. The communication module 330 may include a cellular network module, a WIFI module, a personal area network (PAN) module, a near field communication (NFC) module, and a Bluetooth module. Any type of wireless or wired communication technology may be used to couple the mobile computing device 300 to a cellular network or a local network such as a local wireless network. For example, the connection module 340 may provide a wired connection to power, another device, or another system.

Some embodiments can include provisions that help a mobile computing device 300 to select an optimal resource to request delivery of Internet content. In some embodiments, an application on the mobile computing device 300 can assist in facilitating the selection process. In some embodiments, a local server can store frequently accessed content of websites. This content may also generally be available through the Internet. Given two identical copies of content or websites, one stored in a local server and the other available through the Internet, a mobile computing device 300 can select which resource is better able to provide the content. Both the speed of receiving the content as well as network congestion can both be factors that influence the resource selection process.

Figure 4:
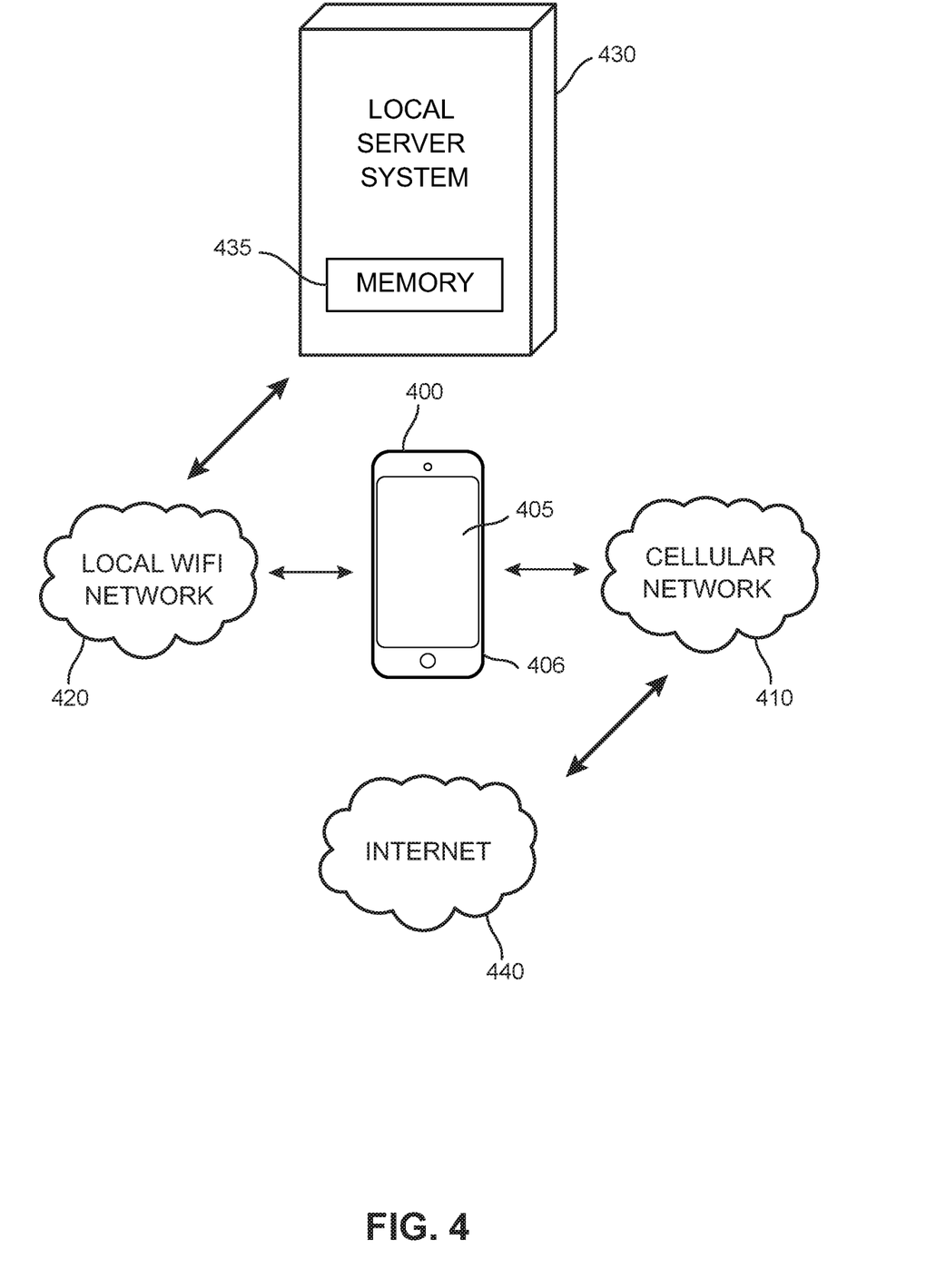
FIG. 4 is a schematic view of an embodiment of a mobile computing device interfacing with a cellular network or local wireless network to access a local server system or the Internet.

FIG. 4 is a schematic view of an embodiment of a mobile computing device 400. The mobile computing device 400 can communicate with multiple different networks. In the embodiment shown in FIG. 4, mobile computing device 400 can communicate with both local WIFI network 420 and cellular network 410. Local WIFI network 420 can communicate with local server system 430. In addition, cellular network 410 can communicate with the Internet 440. The mobile communication device 400 includes a display 405 and the local server system 430 includes a memory 435. The mobile communication device 400 also includes an audio input and audio output 406 such as a microphone and a speaker. The local server system 430 may be a cloud computing system.

Figure 5:
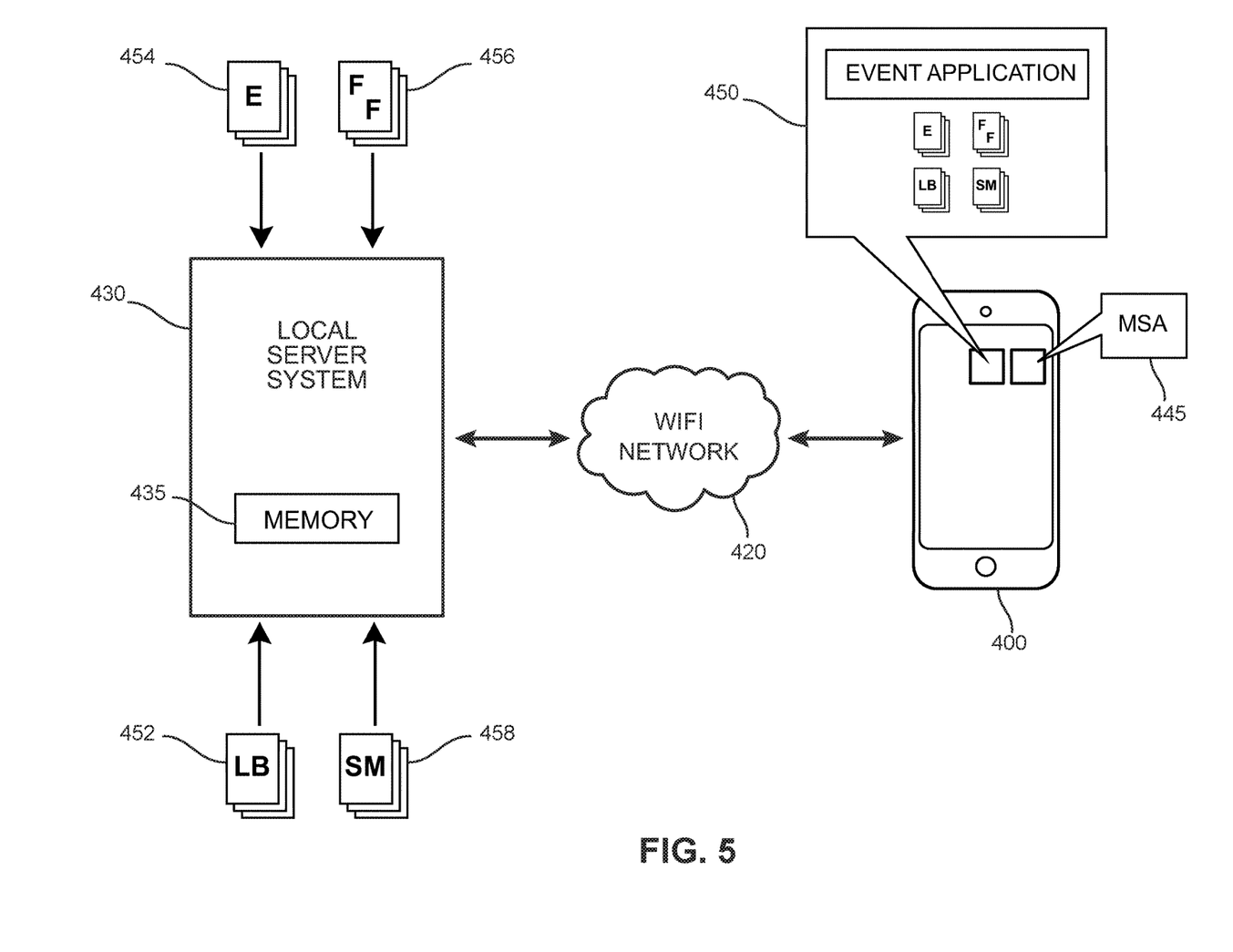
FIG. 5 is a schematic view of an embodiment of a mobile computing device including a software application to access local server system through a local wireless network.

FIG. 5 is a schematic view of an embodiment of a mobile computing device 400 including applications to access local server system 430 through a local wireless network such as WIFI network 420. The WIFI network 420 may wirelessly couple the one or more mobile computing devices 400 to the local server system 430 using one or more routers. The application MSA 445 refers to a miscellaneous application such as a weather application (W) or a financial application (S) as shown in FIG. 2. An event application 450 is also displayed on display 405 of the mobile computing device 400. As discussed below with respect to the flow charts in FIGS. 6 through 8, the event application 450 on mobile computing device 400 may be activated to obtain a list of websites corresponding to website data stored in the memory 435 of the local server system 430 through the wireless network 420. These websites stored in the memory 435 are high traffic websites, which are in high demand by users 210 attending the event at the event location. Examples of high traffic websites may include websites for a local broadcast (LB) 452, a national broadcast (E) (e.g. ESPN®) 454, fantasy football (FF) 456, and social media (SM) 458. For example, once the local server system 430 detects a high traffic website, the local server system 430 stores the high traffic website in memory 435 and outputs a list of high traffic websites to mobile computing devices 400 through an event application 450 activated by a user 210 on a mobile computing device 400. The processes will be discussed in greater detail below with respect to the flow charts in FIGS. 6 through 8.

Figure 6:
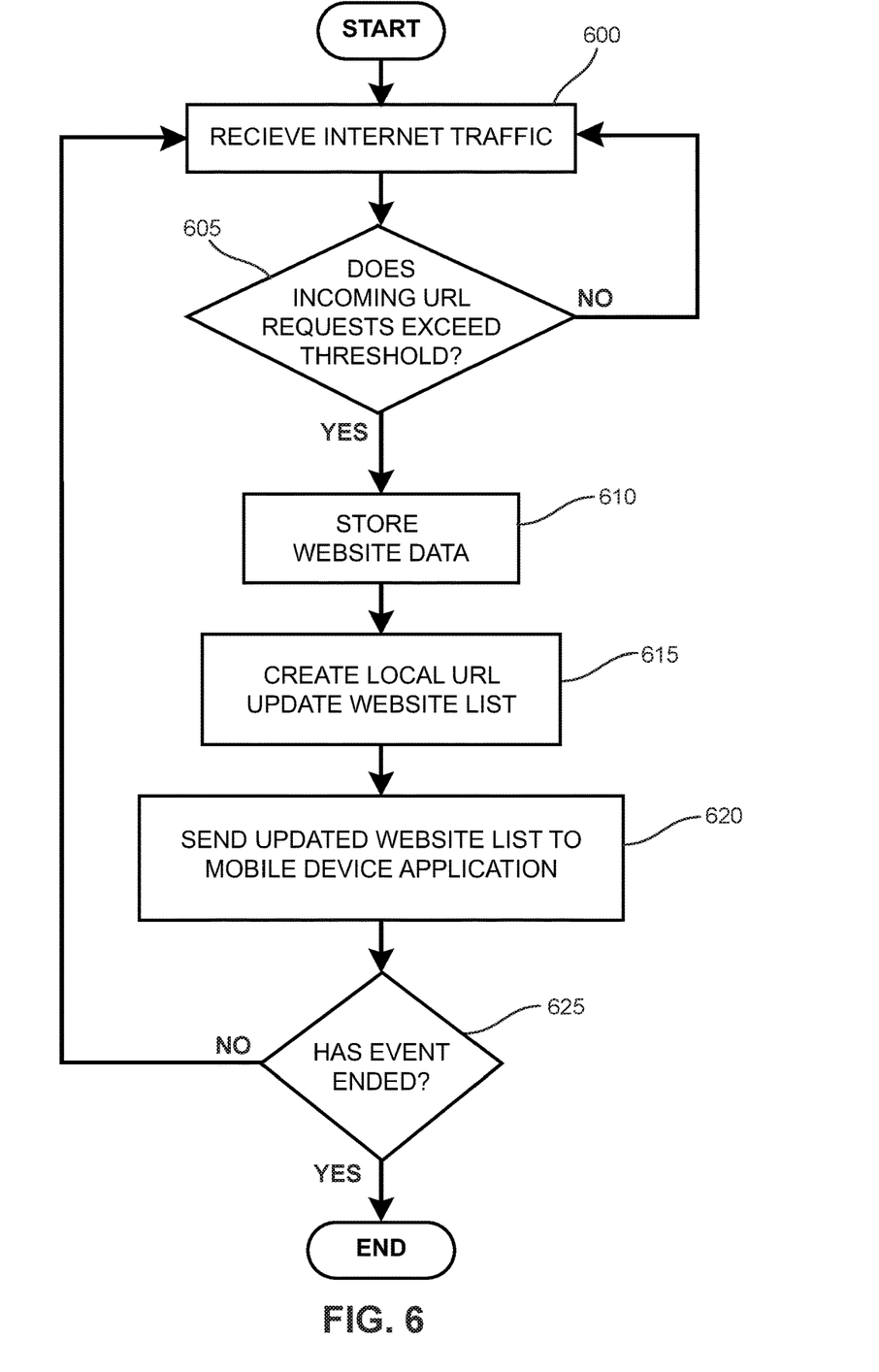
FIG. 6 is a schematic view showing an embodiment of a process for storing high traffic websites in a local server system.

FIG. 6 is a schematic view showing an embodiment of a process for storing high traffic websites in a local server system 430. As indicated in FIG. 4, the local server system 430 is coupled to WIFI network 420 and/or cellular network 410, which are coupled to the Internet 440. In an embodiment, cellular network 410 includes base stations, and one or more base stations are located at or near the event location. In an embodiment, the local WIFI network 420 may include one or more routers such as access points. The one or more base stations and one or more routers can detect websites requested by users of mobile computing devices 400. These websites have uniform resource locators (URLs), which may provide access to website data hosted by a service provider. Website data for each URL may also include the URL itself. In an embodiment, the local server system 430 may receive information regarding the amount of internet traffic from one or more base stations and one or more routers (operation 600). The local server system may determine high traffic websites including website data from the one or more websites detected at the one or more base stations and at the one or more routers, which is based on a number of mobile computing devices 400 requesting access to the detected websites through the one or more base stations. For example, if a URL demanded by users from a website exceeds a predetermined threshold (for example, a maximum number of users), then the website data corresponding to the URL is stored in memory 435 of the local server system 430 (operation 605 and 610). Accordingly, website data of high traffic websites is stored in the memory 435 of local server system 430. A cache is an example of memory 435. Alternatively, if the URL demanded by users from a website does not exceed the predetermined threshold, then the website data corresponding to this website is not stored in memory 435 of the local server system 430 (operation 605) and the operation moves to operation 600 so that internet traffic continues to be received and monitored. In addition, in an alternative embodiment, the local server system may also be directed to continuously store website data from certain predetermined high traffic websites regardless of whether the incoming requests for a URL exceeds a threshold.

After the website data corresponding to a detected high traffic website is stored (operation 610), a local server system creates a local URL and updates a high traffic website list of URLs (operation 615). The high traffic website list includes a list of URLs for the high traffic websites (high traffic URLs), which were identified in operation 605, and includes a local URL corresponding to each high traffic URL hosted by a service provider. In operation 620, the local server system 430 transmits the updated website list to a mobile computing device 400 which has activated an event application for the event, which is stored on the mobile computing device 400. If the event has not yet ended at the event location, the local server system 430 continues to receive and monitor internet traffic (operation 625). However, if the event ends in this embodiment, then the local server system 430 no longer determines whether incoming URL data exceeds a threshold and the process ends (operation 625).

Figure 7:
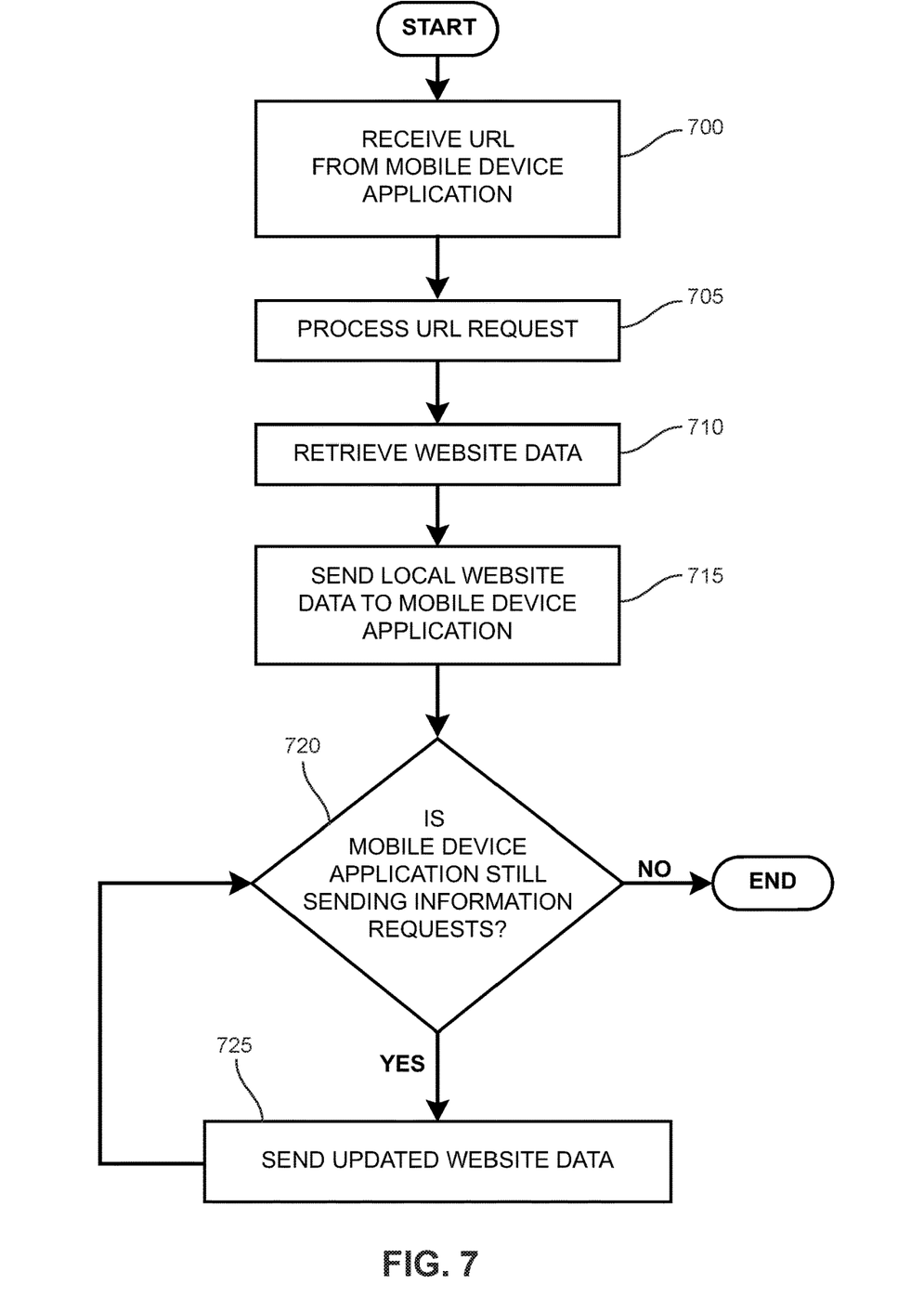
FIG. 7 is a schematic view of an embodiment of a process for providing website data from a local server system to a mobile computing device.

FIG. 7 is a schematic view of an embodiment of a process for providing website data from a local server system 430 to a mobile computing device 400. If a mobile computing device 400 has activated (launched) an event application related to the event taking place at the event location (event application), the user of the mobile computing device 400 may select a website by inputting the website address into a website browser or search engine. If the mobile computing device 400 recognizes that the inputted website is on a high traffic website list stored in the memory 335 of the mobile computing device 400, then the mobile computing device 400 utilizes a local URL corresponding to the URL associated with the inputted website to retrieve website data, which will be discussed in more detail with respect to FIG. 8. As indicated in FIG. 7, the local server system 430 receives the local URL from the mobile computing device 400 by way of a local wireless network such as local WIFI network 420 (operation 700). The local server system 430 processes the URL request (operation 705) and retrieves the website data (operation 710) stored in memory 435 of the local server system 430. The website data stored locally is transmitted (sent) to the mobile computing device 400, which requested the website data (operation 715). If the mobile computing device 400 is no longer coupled to the local server system 430 through the WIFI network 420, then the process with respect to this particular mobile computing device 400 ends (operation 720). If the mobile computing device 400 continues to be coupled to the local server system 430 through the event application, then the local server system 430 continues to send updated website data (operations 720 and 725).

Figure 8:
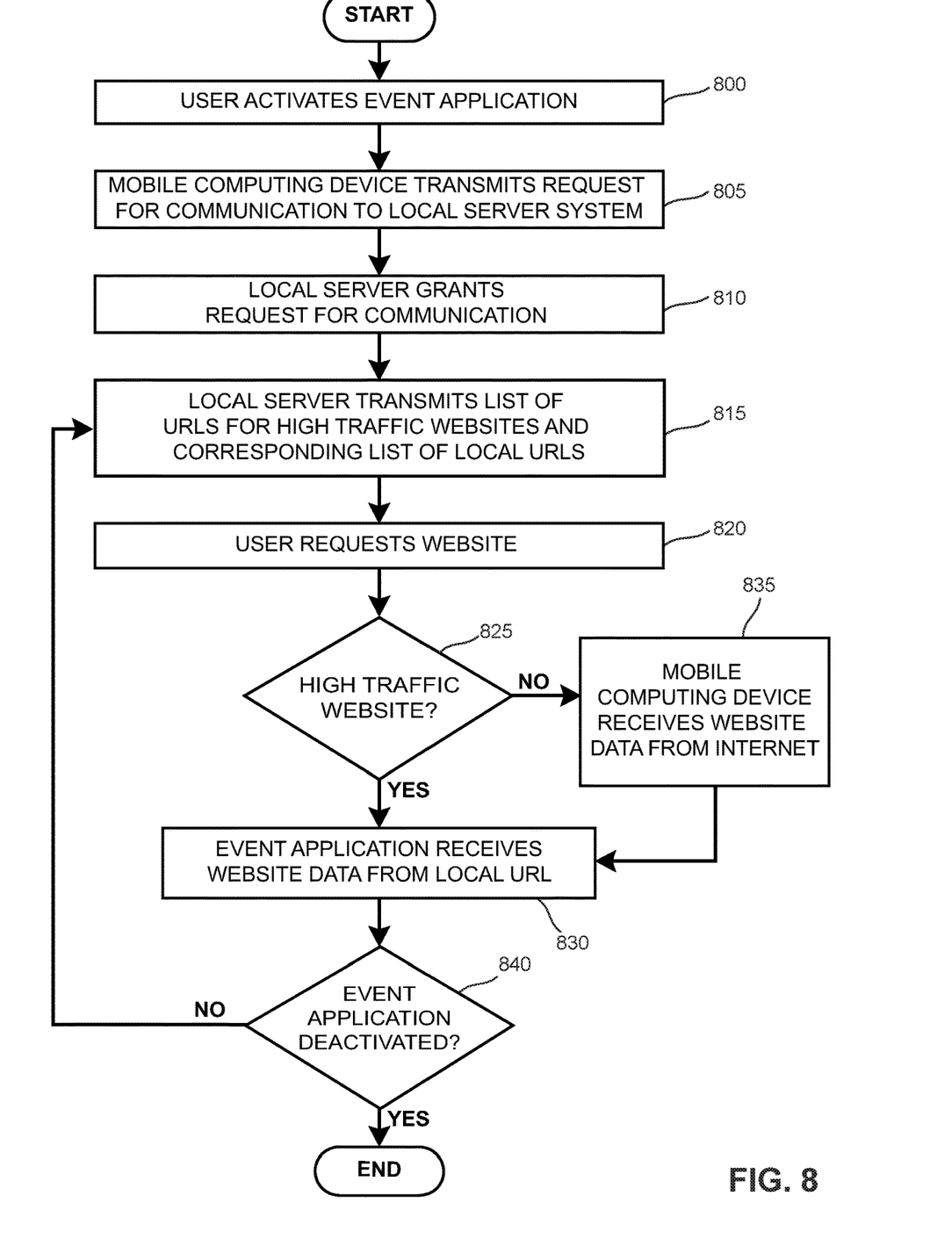
FIG. 8 is a schematic view of an embodiment for a process for a software application stored on a mobile computing device for accessing a local server system.

FIG. 8 is a schematic view of an embodiment for a process for an application stored on a mobile computing device 400 for accessing a local server system 430. After a user turns on a mobile computing device 400, the user may activate an event application 450 (operation 800). After activating (launching) the event application 450, the mobile computing device 400 transmits a request for communication to the local server system 430 (operation 805), and the local server system 430 may grant the request for communication of the mobile computing device 400 (operation 810), so that the mobile computing device 400 and the local server system 430 may communicate by way of the local WIFI network 420. After communication between the mobile computing device 400 and the local network server system 430 is established, the local server system transmits (sends) a list of URLs for high traffic websites (high traffic URLs) and a list of local URLs hosted by the local server system 430, which correspond to the high traffic URLs (operation 815).

A user using the mobile computing device 400 may request access to a website (operation 820). If the requested website is not listed as a high traffic URL, then the mobile computing device 400 receives website data from the Internet 440 through cellular network 410 (operations 825 and 830). For example, suppose the user wishes to connect with the weather channel (W), which is not listed as a high traffic URL. The user may select the weather channel (W) by inputting the website address into a website browser or search engine of the mobile computing device 400. The mobile computing device 400 may then use the URL including IPv4 address 96.8.84.7 to connect the service provider hosting the weather channel (W) to the mobile computing device 400 through the cellular network 410 and the Internet 440, so the mobile computing device 400 can view the weather channel (W) website.

Alternatively, if the requested website is listed as a high traffic URL, then the mobile computing device 400 receives website data from the local network server 430 through the local WIFI network 420 using the local URL (operations 825 and 835). For example, suppose the user wishes to connect with ESPN®, which is listed as a high traffic URL during the event at the event location. The user may select the ESPN® by inputting the website address into a website browser or search engine of the mobile computing device 400. Because the mobile computing device 400 has the list of high traffic websites, then the mobile computing device 400 can convert the URL including the IPv4 address 192.234.2.11 to a local URL address to direct the mobile computing device 400 to the local server system 430 through the local WIFI network 420 to retrieve stored website data of the ESPN® website from memory 435. Accordingly, regardless of whether the website data is stored in the local server system 430 or a service provider, the user merely launches the event application 450 and selects a website by inputting the website address into a website browser or a search engine of the mobile computing device. Thereafter, the event application 450 determines how to obtain the website data for the selected website.

If the event application 450 is deactivated, then the process ends (operation 840). If the event application 450 is not deactivated, then the process moves to operation 815 and continues the process until the event application 450 is deactivated or the event itself ends.

It may be appreciated that the above systems and methods may apply not only to sporting events such as football games but may also apply to any event such as concerts, plays, or fairs.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can include any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multi-protocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for determining and storing website data from high traffic websites in memory of a local server system during a large event at an event location for access by mobile computing devices, comprising:
   detecting, by the local server system, high traffic websites from a plurality of websites requested by the mobile computing devices at the event location, and storing website data from the detected high traffic websites in the memory of the local server system, wherein the detected high traffic websites including website data are received by one or more base stations at the event location;
   activating, on a first mobile computing device of the mobile computing devices at the event location, an event application, which transmits a request from the first mobile computing device for communication with the local server system;
   granting, by the local server system, the request for communication from the first mobile computing device, and transmitting, from the local server system, to the first mobile computing device a high traffic website list corresponding to website data stored in the local server system, wherein the high traffic website list is stored in a memory of the first mobile computing device;
   wherein the high traffic website list includes:
   (1) local uniform resource locators corresponding to uniform resource locators of the high traffic websites stored in the memory of the local server system; and
   (2) the uniform resource locators of the high traffic websites hosted by service providers;
   receiving a selection of a website by a user through the first mobile computing device;
   determining whether the selected website is listed on the high traffic website list;
   upon determining that the selected website is not on the list of high traffic websites, retrieving website data corresponding to the selected website by way of a uniform resource locator of the selected website hosted by a service provider;
   upon determining that the selected website is on the list of high traffic websites, retrieving website data corresponding to the selected website by way of one of the local uniform resource locators of the high traffic websites stored in the memory of the local server system;
   outputting the retrieved website data for the selected website on the first mobile computing device;
   wherein the local server system determines high traffic websites from the plurality of websites based on comparing a number of the mobile computing devices that are requesting access to a particular website of the plurality of websites through the one or more base stations to a predetermined threshold; and
   wherein when the number of the mobile computing devices that are requesting the particular website exceeds the predetermined threshold, storing website data corresponding to the particular website to the memory of the local server system.

2. The method of claim 1, wherein the first mobile computing device comprises one of a smartphone, a tablet, a smartwatch, a smart glass, a smart helmet, and a laptop.

3. The method of claim 1, wherein the one or more high traffic websites are managed by one or more cloud computing systems.

4. The method of claim 1, wherein the local server system comprises one or more servers.

5. The method of claim 1, wherein the local server system is a local cloud computing system for the event location.

6. The method of claim 1, wherein the one or more base stations receive the detected high traffic websites including website data from one or more cloud computing systems which manage the detected high traffic websites.

7. The method of claim 1, wherein the mobile computing devices are coupled to the local server system through a local router.

8. The method of claim 1, wherein the first mobile computing device accesses any website, which is not stored in the local server system, through a base station coupled to one or more cloud computing systems which manage any website which is not stored in the local server system.

9. A system for determining and storing website data from high traffic websites in memory during a large event at an event location for access by mobile computing devices, comprising:
- a local server system positioned at the event location, which is coupled to the mobile computing devices to detect a plurality of websites requested by the mobile computing devices at the event location, wherein the local server system determines high traffic websites from the detected plurality of websites requested by the mobile computing devices at the event location, and stores website data of the high traffic websites in a memory of the local server system, wherein the determined high traffic websites including website data that received by one or more base stations at the event location; and
- a first mobile computing device, from the mobile computing devices, which stores an event application and which is coupled to the local server through the event application, wherein the first mobile computing device employing the event application:
  transmits a request from the first mobile computing device to the local server system at the event location for communication with the local server system;
  receives, from the local server system, authorization to communicate with the local server system, and a high traffic website list corresponding to website data stored in the local server system, wherein the high traffic website list is stored in a memory of the first mobile computing device;
  wherein the high traffic website list includes:
    (1) local uniform resource locators corresponding to uniform resource locators of the high traffic websites stored in the memory of the local server system; and
    (2) the uniform resource locators of the high traffic websites hosted by service providers;
  receives a selection of a website by a user of the first mobile computing device;
  determines whether the selected website is listed on the high traffic website list stored in the memory of the first mobile computing device;
  upon determining that the selected website is not on the list of high traffic website, retrieves website data corresponding to the selected website by way of a uniform resource locator of the selected website hosted by a service provider;
  upon determining that the selected website is on the list of high traffic websites, retrieves website data corresponding to the selected website by way of one of the local uniform resource locators of the high traffic websites stored in the memory of the local server system;
  outputs the retrieved website data for the selected website on the first mobile computing device;
  wherein the local server system determines high traffic websites from the plurality of websites based on comparing a number of the mobile computing devices that are requesting access to a particular website of the plurality of websites through the one or more base stations to a predetermined threshold; and
  wherein when the number of the mobile computing devices that are requesting the particular website exceeds the predetermined threshold, storing website data corresponding to the particular website to the memory of the local server system.

10. The system of claim 9, wherein the first mobile computing device comprises one of a smartphone, a tablet, a smartwatch, a smart glass, a smart helmet, and a laptop.

11. The system of claim 9, wherein the mobile computing devices are coupled to the local server system through one or more local routers.

12. The system of claim 9, wherein the local server system comprises one or more servers.

13. The system of claim 9, wherein the local server system is a local cloud computing system for the event location.

14. The system of claim 9,
wherein the one or more base stations receive the detected high traffic websites including website data from one or more cloud computing systems which manage the detected high traffic websites.

15. A non-transitory computer readable medium storing a software application on a mobile computing device comprising instructions, executable by the mobile computing device, which upon execution, cause the mobile computing device to:
  activate, on the mobile computing device the software application, which transmits a request from the mobile computing device to a local server system positioned at an event location for communication with the local server system;
  receive, from the local server system, authorization to communicate with the local server system, and a high traffic website list corresponding to website data stored in the local server system, wherein the high traffic website list is stored in a memory of the first mobile computing device, wherein the website data from the high traffic website list that received by one or more base stations at the event location;
  wherein the high traffic website list includes:
    (1) local uniform resource locators corresponding to uniform resource locators of the high traffic websites stored in the memory of the local server system; and
    (2) the uniform resource locators of the high traffic websites hosted by service providers;
  receive a selection of a website by a user of the mobile computing device;
  determine whether the selected website is listed on the high traffic website list stored in the memory of the mobile computing device;
  upon determining that the selected website is not on the list of high traffic websites, retrieve website data corresponding to the selected website by way of a uniform resource locator of the selected website hosted by a service provider;
  upon determining that the selected website is on the list of high traffic websites, retrieve website data corresponding to the selected website by way of one of the local uniform resource locators of the high traffic websites stored in the memory of the local server system;
  output the retrieved website data for the selected website on the mobile computing device;
  wherein the local server system determines high traffic websites from the plurality of websites based on comparing a number of the mobile computing devices that are requesting access to a particular website of the plurality of websites through the one or more base stations to a predetermined threshold; and wherein when the number of the mobile computing devices that are requesting the particular website exceeds the predetermined threshold, storing website data corresponding to the particular website to the memory of the local server system.

16. The non-transitory computer readable medium storing a software application of claim 15, wherein the local server system is a local cloud computing system for the event location.

17. The non-transitory computer readable medium storing a software application of claim 15, wherein the mobile computing device comprises one of a smartphone, a tablet, a smartwatch, a smart glass, a smart helmet, and a laptop.

18. The non-transitory computer readable medium storing a software application of claim 15, wherein the one or more high traffic websites are managed by one or more cloud computing systems.

* * * * *